Oct. 16, 1951 J. W. KING ET AL 2,571,369
BAIL EAR FOR CONTAINERS
Filed June 1, 1948

*INVENTORS*
JOHN W KING
JAMES J. McNAMEE
BY
Geo. B. Pitts
ATTORNEY

Patented Oct. 16, 1951

2,571,369

UNITED STATES PATENT OFFICE 2,571,369

BAIL EAR FOR CONTAINERS

John W. King and James J. McNamee, Cleveland, Ohio, assignors to Miles Park Machine & Tool, Inc., Cleveland, Ohio, a corporation of Ohio Application June 1, 1948, Serial No. 30,454

1 Claim. (Cl. 220—91)

This invention relates to containers, more particularly to the container bail and its mounting on the side wall of the container, whereby the latter may be lifted, carried and tipped for pouring.

One object of the invention is to provide an improved mounting for the bail of a container wherein the opposite ends of the bail are rotatably or swingably connected to the side wall of the container and locked against removal.

Another object of the invention is to provide an improved mounting for the opposite ends of a bail of a container wherein the walls of the bail ear on which the bail ends rotate lock the latter against removal.

Another object of the invention is to provide an improved mounting for the opposite ends of a bail for a container, the mounting consisting of ears each constructed to provide spaced walls, one thereof being formed of resilient sheet metal which facilitates positioning of a bail end therein but locks it against removal while permitting free rotative movement between the bail and container.

Another object of the invention is to provide an improved bail mounting of relatively simple construction to facilitate the assembly of the bail and reduce labor costs.

A further object of the invention is to provide improved bail mountings constructed to automatically grip the bail ends when the latter are inserted in the mounting and lock the ends against removal.

Other objects of the invention will be apparent to those skilled in the art to which our invention relates from the following description taken in connection with the accompanying drawing, wherein Fig. 1 is a side view of a container having mountings for the bail ends embodying our invention.

Figure 2:
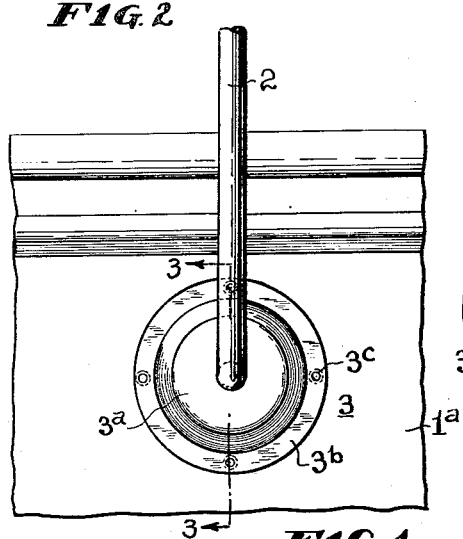
Fig. 2 is a fragmentary side view of the container showing the mounting for one end of the bail, enlarged.
Figure 1:
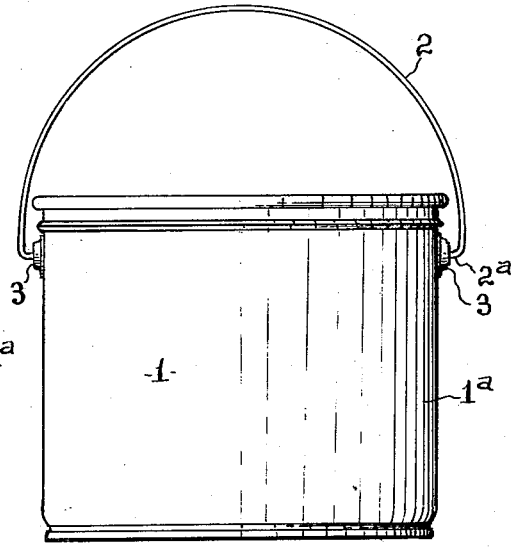
Figure 4:
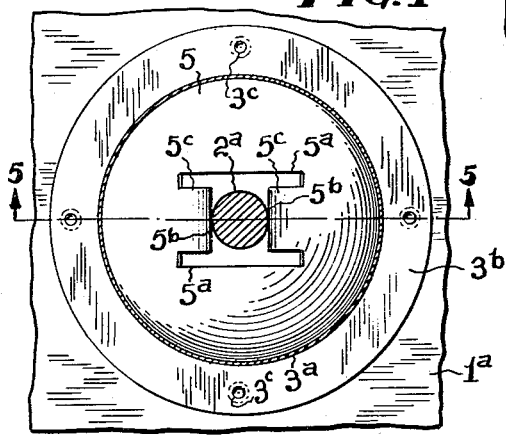
Fig. 4 is a section on the line 4—4 of Fig. 3.
Figure 3:
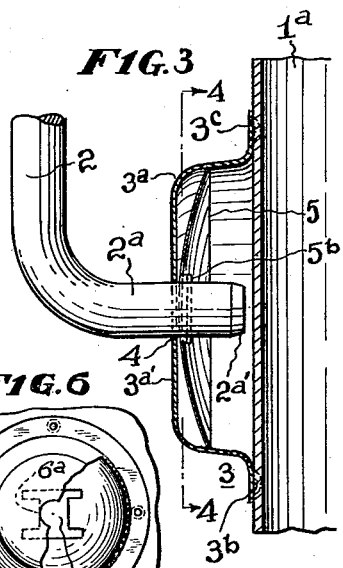
Fig. 3 is a section on the line 3—3 of Fig. 2.
Figure 5:
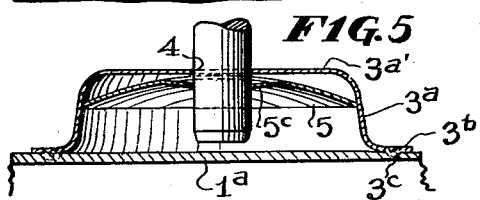
Fig. 5 is a section on the line 5—5 of Fig. 4.

In the drawing, referring particularly to Figs. 1 to 5, inclusive, 1 indicates as an entirety a container for various kinds of liquids, semi-liquids and other materials having a side wall 1a formed of sheet metal and a top or cover, which may be applied to the side wall in any desired manner and provided with a pouring spout or other fittings applicable to special conditions of use. 2 indicates a bail, preferably of arcuate shape, the opposite ends 2a of which are bent inwardly at substantially right angles to the adjacent portions of the bail and rotatably or swingably supported in mountings, each indicated as an entirety at 3, secured to the side wall 1a in diametrical relation. Each mounting 3 consists of a cup-like member 3a formed of sheet metal, the skirt or side wall of the member terminating in a circumferential flange 3b which may be secured or connected to the container side wall 1a in any desired manner. As showing one form of connection, the flange 3b extends outwardly and is spot welded to the side wall 1a, as indicated at 3c. The bottom wall 3a' of the cup-like member 3a is formed with an axially disposed opening 4 and associated with the wall 3a' on the inner side thereof is a connector 5 of convex-concave shape formed of resilient relatively thin sheet metal, the periphery of which is in frictional engagement with the skirt or side wall of the member 3a with the crown of the connector 5 related to the marginal edge of the opening 4. The crown of the connector 5 is formed with an opening shaped to form parallelly related sections 5a connected intermediate their opposite ends by a section 5b, whereby is provided between the sections 5a wings 5c the terminating edges of which are spaced a distance slightly less than the diameter of the adjacent bail end 2a and substantially equal distances from the axis of the opening 4. In this arrangement and form of construction it will be observed that the adjacent bail end 2a may be readily inserted through the opening 4 and between and beyond the wings 5c, and the latter, due to their resiliency will engage the bail end 2a and lock it against outward pull or movement, while permitting it to rotate about the axis of the opening 4; it will also be observed that this locking action is increased substantially in proportion to any force applied to move the bail end 2a outwardly, so that the rotatable connection of each bail end 2a with the container side wall is of a permanent character and attained in a simple manner and without the employment of rivets, bolts, nuts, threaded walls or the use of tools. By preference, each bail end 2a terminates in a conical wall 2a' to facilitate its engagement with the edges of the wings 5c when the insertion of the bail end in one of the mountings 3 takes place. This form of mounting is not only relatively simple but when the assembly of the bail is made it is only necessary to expand the bail in its plane, to insert its opposite ends in position in the mountings 3.

As lateral distortion or twisting of one side portion of the bail relative to its other side portion is eliminated, less handling or manipulation of the bail takes place and less time is required to assemble a bail in position.

Figure 6:
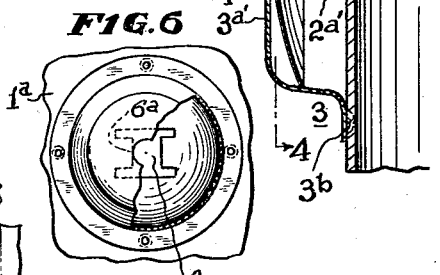
Fig. 6 is a fragmentary side view (parts being broken away) showing a modified form of construction.
Figures 7, 8:
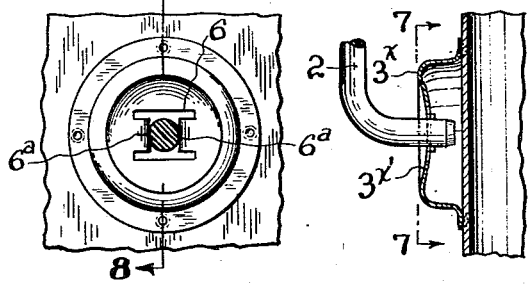
Fig. 7 is a section on the line 7—7 of Fig. 8.
Fig. 8 is a section on the line 8—8 of Fig. 7.

Figs. 6, 7 and 8 illustrate a modified form of construction wherein the cup-like member 3x is formed of resilient metal and its bottom wall 3x' is embossed inwardly and of concave-convex shape. The crown portion of the wall 3x' is formed with an opening 6 similar in shape to the opening shown in Figs. 3, 4 and 5, to provide opposed resilient gripping wings 6a, which permit ready assembly of the bail end 2a therethrough and are then engageable with the bail end to prevent its removal, but permitting swinging of the bail about the mountings.

From the foregoing description it will be apparent that the bail mountings are highly advantageous since the bail ends being disposed at right angles to the contiguous portions thereof, they can be readily bent or expanded so that minimum distortion of end portions of the bail is required to assemble the latter in the mountings. Likewise the mountings may be readily stamped out and secured to the side wall of the container ready to permit the quick assembly therein of the bail ends, whereby labor costs are materially reduced; furthermore, the bail ends are automatically gripped and locked against removal.

What we claim is:

A container having a vertical cylindrical side wall, diametrically related cup-shaped members formed of resilient sheet metal and each having a peripheral flange secured to the outer surface of the side wall, the bottom of wall of each member being embossed inwardly and of concavo-convex shape, said bottom wall being formed with an opening shaped to provide two inwardly extending horizontally alined wings having vertical free edges which are in opposed spaced relation, and a bail having terminating end portions each disposed at right angles to the contiguous portion of said bail and projecting between and rotatably supported by the adjacent wings, each end portion being round in cross section and of uniform diameter from end to end and having a diameter greater than the spacing between the free edges of the adjacent wings, whereby the latter grip the adjacent bail end portion and prevent outward movement thereof.

JOHN W. KING.
JAMES J. McNAMEE.

REFERENCES CITED

The following references are of record in the file of this patent:

UNITED STATES PATENTS

| Number | Name | Date |
| --- | --- | --- |
| 312,943 | Winans | Feb. 24, 1885 |
| 944,696 | Schmidt | Dec. 28, 1909 |
| 1,020,653 | Mueller | Mar. 19, 1912 |
| 2,088,605 | McCarthy | Aug. 3, 1937 |
| 2,169,181 | Kost | Aug. 8, 1939 |
| 2,176,711 | Gorman, Jr. | Oct. 17, 1939 |
| 2,239,798 | Tinnerman | Apr. 29, 1941 |